Patented Sept. 3, 1946

2,406,763

UNITED STATES PATENT OFFICE 2,406,763

PURIFICATION OF OIL-SOLUBLE SULPHONATES

William K. Griesinger, Drexel Hill, Pa., assignor to The Atlantic Refining Company, Philadelphia, Pa., a corporation of Pennsylvania No Drawing. Application September 29, 1944, Serial No. 556,473

11 Claims. (Cl. 260—504)

The present invention relates to improvements in the purification of oil-soluble sulphonates, and particularly petroleum mahogany sulphonates.

The conventional refining treatment of lubricating oil distillates derived from petroleum includes the application of fuming sulphuric acid. This reacts with the oil, producing a sludge containing tarry material, spent sulphuric acid, and certain types of sulphonic acids. Though the concentration of $SO_3$ in the fuming acid may vary considerably, a 20% fuming acid is employed in most cases. As a result of the high degree of sulphonation obtained in the acid treatment, a considerable amount of sulphonic acids is produced. These are principally of two types, namely, the water-soluble type predominantly contained in the sludge, and the oil-soluble type predominantly found in the treated oil. The application of the acid is regulated in a manner well known in the art to produce the desired sulphonation, and in general, temperatures not exceeding 140° F. are preferred. The sulphonic acids contained in the sludge, while limitedly soluble, if at all, in hydrocarbon oils, are highly water-soluble, imparting to their aqueous solution a dark-green color, and being for this reason referred to as "green sulphonic acids." The acids remaining in solution in the oil impart a reddish color to the oil, and for this reason are generally referred to as "mahogany sulphonic acids." After the separation of the oil from the acid sludge, the mahogany sulphonic acids are removed from the oil by the ordinary refining method comprising conversion of the acids into salts or soaps by direct neutralization of the acid treated oil followed by extraction with a suitable solvent, for example, an aqueous solution of isopropyl alcohol. The mahogany sulphonates constitute a valuable by-product of petroleum refining, and are used for a variety of purposes including the production of oil detergents, emulsifiers, and fat splitting agents.

The crude mahogany sulphonates, as they are derived from an acid treated oil, contain varying amounts of inorganic salts, notably sulphates and sulphites, as well as considerable amounts of oil and water, and it is in many cases not only desirable but even necessary to substantially remove the inorganic salts and water.

I have found that these impurities comprising inorganic salts and water may be removed by treatment of the crude sulphonates with a combination of solvents, one of which comprises a low viscosity hydrocarbon and the second comprising a lower aliphatic alcohol. The low viscosity hydrocarbon may be exemplified by liquefied normally gaseous hydrocarbons such as liquid propane or the liquid butanes, or mixtures thereof; pentane, hexane, heptane, or octane; benzene, toluene, xylene; and petroleum naphthas, particularly those boiling within the range of 190° F. to 275° F. The low viscosity hydrocarbon or hydrocarbon mixture employed must be capable of dissolving the sulphonates, but not the salts or water, and must be capable of ready removal from the purified sulphonates, for example, by distillation at temperatures below the decomposition temperature of the sulphonates. The lower aliphatic alcohols which are utilized in accordance with this invention include methyl alcohol, ethyl alcohol, propyl alcohol, isopropyl alcohol, and the butyl alcohols, or mixtures of two or more of these alcohols.

In practicing my invention, the crude oil soluble sulphonates containing inorganic salts and water are thoroughly mixed with from 2 to 6 volumes of low viscosity hydrocarbon solvent and with 0.02 to 0.1 volume of lower aliphatic alcohol, based upon the crude sulphonates to be purified. The mixture is thoroughly agitated and then permitted to settle and stratify into two layers, one layer comprising purified sulphonates, hydrocarbon solvent, and alcohol, the sulphonates containing little or no inorganic salts or water, and a second layer comprising inorganic salts, water, and alcohol. The layers are separated from one another and the sulphonate-containing layer is subjected to treatment for the removal and recovery of the hydrocarbon solvent and alcohol. Such treatment may comprise distillation at atmospheric or sub-atmospheric pressure, the recovered solvent and alcohol being recirculated for the treatment of additional quantities of crude sulphonates. In the event that it is desired to accelerate the separation of the purified sulphonate solution from the water, inorganic salts, and alcohol, the original mixture of impure sulphonates, hydrocarbon solvent and alcohol may be centrifuged after vigorous agitation, whereby the purified sulphonate solution is separated from the impurities.

In another and preferred mode of operation, the crude sulphonates are thoroughly mixed with from 2 to 6 volumes of low viscosity hydrocarbon solvent, and the mixture is then permitted to settle and stratify into two layers, the upper layer comprising sulphonates, hydrocarbon solvent and a minor amount of inorganic salts and water, and the lower layer comprising the bulk of the inorganic salts and water. The layers are separated, and the upper layer is thoroughly mixed with 0.02 to 0.1 volume of a lower aliphatic alcohol and with 0.1 to 0.2 volume of water, based upon the original volume of crude sulphonates to be purified. The resulting mixture is then permitted to settle and stratify into two layers, the upper layer comprising substantially salt-free sulphonates, hydrocarbon solvent, and alcohol, and the lower layer comprising water, alcohol, and traces of inorganic salts. The layers are separated, the lower layer preferably being recycled for admixture with additional quantities of crude sulphonates, while the upper layer is subjected to distillation for the removal and recovery of the hydrocarbon solvent and alcohol. The distillation residue constitutes the purified product, i. e., sulphonates substantially free of inorganic salts and water, and containing substantially all of the oil initially associated with the crude sulphonates. If it is desired to reduce or remove the oil from the purified sulphonates, the oil-sulphonate mixture may be subjected to further treatment with solvents to extract the oil from the sulphonates, or the sulphonates from the oil. Such treatment is conventional and is not considered as constituting part of the present invention. Generally, the separation of oil from oil-soluble sulphonates is performed by diluting the oil-sulphonate mixture with naphtha and washing the sulphonates from the diluted mixture with dilute alcohol, using relatively large quantities of dilute alcohol.

My invention may be further illustrated by the following example, which, however, is not to be construed as limiting the scope thereof.

A viscous hydrocarbon oil, after acid treatment with fuming sulphuric acid and separation of sludge, was neutralized with aqueous sodium hydroxide, and the resulting oil-soluble sulphonates were separated from the neutralized oil by extraction with aqueous isopropyl alcohol. After removal of the alcohol by distillation, there was obtained a crude sulphonate soap having the following approximate composition:

|  | Per cent |
|---|---|
| Oil-soluble sodium sulphonate | 25.0 |
| Oil | 24.5 |
| Water | 48.0 |
| Inorganic salts | 2.0 |
| Free sodium hydroxide | 0.5 |

One volume of the crude soap was thoroughly mixed with 3 volumes of petroleum naphtha having a boiling range of 190° F. to 275° F., and the mixture was allowed to settle for 24 hours at about 75° F. Upon settling, stratification occurred with the formation of two layers, the upper layer amounting to 3.53 volumes and comprising naphtha and sulphonates from which the bulk of the water and inorganic salts had separated. The lower layer amounting to 0.47 volume and comprising water containing the inorganic salts was separated from the upper layer and was discarded. The upper layer was then thoroughly mixed with 0.0392 volume of 91% isopropyl alcohol and 0.157 volume of water, based upon the crude soap initially charged. Since the crude soap contained an undesirable excess of free sodium hydroxide, i. e., 0.5%, only a portion of which was removed in the salt water from the first settling operation, sufficient mineral acid, preferably sulphuric acid, was added to the alcohol-water diluted naphtha solution of the partially purified sulphonate soap to approximately neutralize the residual free alkali. By thus rendering the soap substantially neutral, difficulties were avoided in the settling and separation of the layers. In the event that the crude soap is initially approximately neutral, the addition of mineral acid is of course unnecessary. After thorough agitation of the neutralized, partially purified naphtha solution of sulphonate soap with the added isopropyl alcohol and water, the mixture was permitted to settle for at least 36 hours to permit stratification into two layers, the upper layer amounting to 3.5 volumes and comprising a clear naphtha solution of purified soap containing a portion of the isopropyl alcohol and traces of water, and the lower layer amounting to 0.225 volume and comprising water, residual salts, and the remainder of the isopropyl alcohol. The layers were separated from one another, and the upper layer was distilled to remove the naphtha, alcohol, and traces of water, while the lower layer was recycled for admixture with an additional quantity of crude sulphonates to be purified. Upon removal of the naphtha, alcohol, and traces of water from the upper layer by distillation, there was obtained as a residue a purified sulphonate soap amounting to 0.5 volume having the following composition.

|  | Per cent |
|---|---|
| Oil-soluble sodium sulphonate | 50.0 |
| Oil | 50.0 |
| Water | 0.0 |
| Inorganic salts | 0.05 |

This purified soap had a neutralization number of 0.2 mg. KOH/g. alkaline.

While I have described my invention primarily in connection with the purification of white oil soaps or mahogany sulphonates, my process is also applicable to the purification of other oil-soluble sulphonates such as the alkali or alkaline earth metal soaps of sulphonic acids derived from the refining or sulphonation of petroleum distillate oils of lubricating oil viscosity, selective solvent extract or naphthenic fractions of lubricating oil stocks, and the like.

I claim:

1. The method of purifying oil-soluble petroleum sulphonates containing inorganic salts and water, which comprises contacting said sulphonates with from 2 to 6 volumes of low viscosity hydrocarbon solvent which dissolves the sulphonates but not the salts and with 0.02 to 0.1 volume of a lower aliphatic alcohol, and separating the resulting solution of purified sulphonates from the inorganic salts and water.

2. The method of purifying oil-soluble petroleum sulphonates containing inorganic salts and water, which comprises contacting said sulphonates with from 2 to 6 volumes of low viscosity hydrocarbon solvent which dissolves the sulphonates but not the salts and with 0.02 to 0.1 volume of a lower aliphatic alcohol, settling and stratifying the resulting mixture into two layers, and separating a layer comprising inorganic salts, water, and alcohol from a second layer comprising purified sulphonates, hydrocarbon solvent, and alcohol.

3. The method of purifying oil-soluble petroleum sulphonates containing inorganic salts and water, which comprises contacting said sulphonates with from 2 to 6 volumes of low viscosity hydrocarbon solvent which dissolves the sulphonates but not the salts and with 0.02 to 0.1 volume of a lower aliphatic alcohol, settling and stratifying the resulting mixture into two layers, separating a layer comprising inorganic salts, water, and alcohol from a second layer comprising purified sulphonates, hydrocarbon solvent, and alcohol, and removing the solvent and alcohol from the purified sulphonates.

4. The method of purifying oil-soluble petroleum sulphonates containing inorganic salts and water, which comprises contacting said sulphonates with from 2 to 6 volumes of petroleum naphtha which dissolves the sulphonates but not the salts and with 0.02 to 0.1 volume of isopropyl alcohol, and separating the resulting solution of purified sulphonates from the inorganic salts and water.

5. The method of purifying oil-soluble petroleum sulphonates containing inorganic salts and water, which comprises contacting said sulphonates with from 2 to 6 volumes of petroleum naphtha which dissolves the sulphonates but not the salts and with 0.02 to 0.1 volume of isopropyl alcohol, settling and stratifying the resulting mixture into two layers, and separating a layer comprising inorganic salts, water, and isopropyl alcohol from a second layer comprising purified sulphonates, petroleum naphtha, and isopropyl alcohol.

6. The method of purifying oil-soluble petroleum sulphonates containing inorganic salts and water, which comprises contacting said sulphonates with from 2 to 6 volumes of petroleum naphtha which dissolves the sulphonates but not the salts and with 0.02 to 0.1 volume of isopropyl alcohol, settling and stratifying the resulting mixture into two layers, separating a layer comprising inorganic salts, water, and isopropyl alcohol from a second layer comprising purified sulphonates, petroleum naphtha, and isopropyl alcohol, and removing the petroleum naphtha and isopropyl alcohol from the purified sulphonates.

7. The method of purifying oil-soluble petroleum sulphonates containing inorganic salts and water, which comprises contacting said sulphonates with from 2 to 6 volumes of low hydrocarbon solvent which dissolves the sulphonates but not the salts, settling and stratifying the resulting mixture into two layers, one comprising sulphonates, hydrocarbon solvent and a minor amount of salts and water, and a second layer comprising salts and water, separating the layers, contacting the layer comprising sulphonates, hydrocarbon solvent and a minor amount of salts and water with 0.02 to 0.1 volume of a lower aliphatic alcohol and 0.1 to 0.2 volume of water based upon the original sulphonates, settling and stratifying the resulting mixture into two layers, one comprising inorganic salts, water, and alcohol and a second layer comprising purified sulphonates, hydrocarbon solvent and alcohol, and separating the layers from one another.

8. The method of purifying oil-soluble petroleum sulphonates containing inorganic salts and water, which comprises contacting said sulphonates with from 2 to 6 volumes of low viscosity hydrocarbon solvent which dissolves the sulphonates but not the salts, settling and stratifying the resulting mixture into two layers, one comprising sulphonates, hydrocarbon solvent and a minor amount of salts and water, and a second layer comprising salts and water, separating the layers, contacting the layer comprising sulphonates, hydrocarbon solvent and a minor amount of salts and water with 0.02 to 0.1 volume of a lower aliphatic alcohol and 0.1 to 0.2 volume of water based upon the original sulphonates, settling and stratifying the resulting mixture into two layers, one comprising inorganic salts, water, and alcohol and a second layer comprising purified sulphonates, hydrocarbon solvent and alcohol, separating the layers from one another, and removing the solvent and alcohol from the purified sulphonates.

9. The method of purifying oil-soluble petroleum sulphonates containing inorganic salts and water, which comprises contacting said sulphonates with from 2 to 6 volumes of petroleum naphtha which dissolves the sulphonates but not the salts, settling and stratifying the resulting mixture into two layers, one comprising sulphonates, petroleum naphtha and a minor amount of salts and water, and a second layer comprising salts and water, separating the layers, contacting the layer comprising sulphonates, petroleum naphtha and a minor amount of salts and water with 0.02 to 0.1 volume of isopropyl alcohol and 0.1 to 0.2 volume of water based upon the original sulphonates, settling and stratifying the resulting mixture into two layers, one comprising inorganic salts, water, and isopropyl alcohol and a second layer comprising purified sulphonates, petroleum naphtha and isopropyl alcohol, and separating the layers from one another.

10. The method of purifying oil-soluble petroleum sulphonates containing inorganic salts and water, which comprises contacting said sulphonates with from 2 to 6 volumes of petroleum naphtha which dissolves the sulphonates but not the salts, settling and stratifying the resulting mixture into two layers, one comprising sulphonates, petroleum naphtha and a minor amount of salts and water, and a second layer comprising salts and water, separating the layers, contacting the layer comprising sulphonates, petroleum naphtha and a minor amount of salts and water with 0.02 to 0.1 volume of isopropyl alcohol and 0.1 to 0.2 volume of water based upon the original sulphonates, settling and stratifying the resulting mixture into two layers, one comprising inorganic salts, water, and isopropyl alcohol and a second layer comprising purified sulphonates, petroleum naphtha and isopropyl alcohol, separating the layers from one another, and removing the petroleum naphtha and isopropyl alcohol from the purified sulphonates.

11. The method of purifying oil-soluble petroleum sulphonates containing inorganic salts in water, which comprises contacting said sulphonates with 3 volumes of petroleum naphtha which dissolves the sulphonates but not the salts, settling and stratifying the resulting mixture into two layers, one comprising sulphonates, petroleum naphtha, and a minor amount of salts and water, and a second layer comprising salts and water, separating the layers, contacting the layer comprising sulphonates, petroleum naphtha and a minor amount of salts and water with 0.06 volume of isopropyl alcohol and 0.16 volume of water based upon the original sulphonates, settling and stratifying the resulting mixture into two layers, one comprising inorganic salts, water, and isopropyl alcohol and a second layer comprising purified sulphonates, petroleum naphtha and isopropyl alcohol, and separating the layers from one another.

WILLIAM K. GRIESINGER.